(12) United States Patent
Jia et al.

(10) Patent No.: US 10,907,067 B2
(45) Date of Patent: Feb. 2, 2021

(54) DEACIDIFYING AND REINFORCING AGENT FOR CELLULOSE ACETATE FILM

(71) Applicant: SHAANXI NORMAL UNIVERSITY, Shaanxi (CN)

(72) Inventors: Zhihui Jia, Shaanxi (CN); Yuhu Li, Shaanxi (CN)

(73) Assignee: SHAANXI NORMAL UNIVERSITY, Shaanxi (CN)

(*) Notice: Subject to any disclaimer, the term of this patent is extended or adjusted under 35 U.S.C. 154(b) by 8 days.

(21) Appl. No.: 16/074,208

(22) PCT Filed: Mar. 31, 2017

(86) PCT No.: PCT/CN2017/079024
§ 371 (c)(1),
(2) Date: Jul. 31, 2018

(87) PCT Pub. No.: WO2017/215318
PCT Pub. Date: Dec. 21, 2017

(65) Prior Publication Data
US 2019/0330488 A1 Oct. 31, 2019

(30) Foreign Application Priority Data

Jun. 14, 2016 (CN) .......................... 2016 1 0422445

(51) Int. Cl.
*C09D 101/28* (2006.01)
*C09D 7/61* (2018.01)
(Continued)

(52) U.S. Cl.
CPC ............. *C09D 101/28* (2013.01); *C09D 7/61* (2018.01); *C09D 7/67* (2018.01); *C09D 163/00* (2013.01);
(Continued)

(58) Field of Classification Search
CPC .......... C09D 101/28; C09D 7/61; C09D 7/67; C09D 163/00; C09L 1/28; C08L 63/00;
(Continued)

(56) References Cited

U.S. PATENT DOCUMENTS 3,676,182 A * 7/1972 Smith ................. B41M 7/0063
427/316
6,641,877 B2 * 11/2003 Johnson ................. D21H 25/18
206/205
(Continued)

FOREIGN PATENT DOCUMENTS

CN 103131304 A * 6/2013
CN 104292965 A * 1/2015
(Continued)

*Primary Examiner* — Nicholas E Hill

(57) ABSTRACT

A method for preparing a deacidifying and reinforcing agent for a cellulose acetate film includes steps of: ultrasonically dispersing a nanometer alkaline oxide into an ethyl cellulose n-butanol solution, so as to form a nanometer alkaline oxide suspension, then adding a mixture of E51 EPOXY RESIN and a curing agent thereof; wherein the nanometer alkaline oxide is a nanometer magnesium oxide, a nanometer cerium oxide, a nanometer magnesium hydroxide, a nanometer potassium carbonate, a nanometer calcium hydroxide or a nanometer barium hydroxide. A method for using the deacidifying and reinforcing agent includes steps of: evenly applying the deacidifying and reinforcing agent on a surface of a cellulose acetate film.

8 Claims, 3 Drawing Sheets

(51) Int. Cl.
*C09D 7/40* (2018.01)
*C09D 163/00* (2006.01)
*G03C 11/08* (2006.01)
*G06T 5/00* (2006.01)

(52) U.S. Cl.
CPC ............. *G03C 11/08* (2013.01); *G06T 5/005* (2013.01); *G06T 2207/10016* (2013.01); *G06T 2207/20204* (2013.01)

(58) Field of Classification Search
CPC .................. G03C 11/08; G06T 5/005; G06T 2207/10016; G06T 2207/20204
See application file for complete search history.

(56) References Cited

U.S. PATENT DOCUMENTS

| | | | | |
|---|---|---|---|---|
| 6,676,856 B1 * | 1/2004 | Smith | ................. | B41M 7/0027 252/387 |
| 2008/0017336 A1 * | 1/2008 | Wachter | ................. | D21H 25/18 162/54 |

FOREIGN PATENT DOCUMENTS

| | | | | |
|---|---|---|---|---|
| CN | 104909801 | A | * | 9/2015 |
| CN | 105885547 | A | * | 8/2016 |

\* cited by examiner

DEACIDIFYING AND REINFORCING AGENT FOR CELLULOSE ACETATE FILM

CROSS REFERENCE OF RELATED APPLICATION

This is a U.S. National Stage under 35 U.S.C 371 of the International Application PCT/CN2017/079024, d Mar. 31, 2017, which claims priority under 35 U.S.C. 119(a-d) to CN 201610422445.8, d Jun. 14, 2016.

BACKGROUND OF THE PRESENT INVENTION

Field of Invention

The present invention relates to a technical field of image repair and protection, and more particularly to a deacidifying and reinforcing agent for a cellulose acetate film.

Description of Related Arts 100 years has passed since the birth of photographic film which plays an important role in all aspects of political, economic, educational, military, medicine, art and even people's daily lives. Cellulose acetate film is the most widely used and collected by museums. There are a huge amount of film archives in the United States Getty, Roman Restoration Center, Central Archives, China's First Historical Archives, China's Second Historical Archives, China Photo Archives, China Film Archive, National Library, National Museum, etc. However, because of factors such as forming material of the film and poor storage environment, there have been mildew, scratch, discoloration, acetate syndrome and other disease phenomenon, wherein acetate syndrome is known as "cancer" of cellulose acetate film, which comprises acetic acid smelling, surface crystal precipitation, dimensional shrinkage or even distortion, and decrease in the mechanical properties, resulting in that the film cannot be used, copied or digitized. Without timely repair and protection, the film emulsion layer will be liquefied and fall off until film record completely disappears. Conventionally, the problem is only prevented by strictly controlled environment, and no sufficient treatment is available. Acetate syndrome is mainly caused by hydrolysis of cellulose triacetate which is a substrate material. Cellulose triacetate is carboxylate ester formed by esterification reaction between three hydroxyl groups on the glucose ring in the cellulose molecule and acetic acid, wherein glucose ring in the cellulose molecule are interconnected by glycoside bond, while carboxylate ester and water will lead hydrolysis. With autocatalysis of the acid as a catalyst, hydrolysis reaction is accelerated. Meanwhile, the hydrolysis may also happen between glucoside bond and water, in such a manner that cellulose acetate ester molecule is shorted due to chain breakage. Hydrolysis reaction of the substrate not only greatly decreases the performance thereof, but also causes negative effects to an emulsion layer carried by the substrate, which directly affects the imaging results, or even destroys the film. Thus, an effective way to treat acetate syndrome is inhibiting autocatalysis of acetate gas emitted by degradation of cellulose acetate film.

Conventionally, repair of cellulose acetate film is mainly focused on prevention, detection and mechanism of the acetate syndrome of the cellulose acetate film, and delaying the disease by controlling temperature and humidity for storing the film. Deacidification of the cellulose acetate film with the acetate syndrome is a bottleneck problem. There is no ready-made theoretical guidance or evaluation on the deacidification material of cellulose acetate film archives all over the world. Conventionally, deacidifying agents used in the cellulose acetate film archives are mainly inorganic bases but with numerous varieties. Furthermore, if the deacidifying agent is directly used, deacidification process will have an adverse effect on the image information and mechanical properties of the film archives.

SUMMARY OF THE PRESENT INVENTION

For solving essential reasons of acetate syndrome of cellulose acetate film archives, an object of the present invention is to provide a deacidifying and reinforcing agent with integrated deacidifying and reinforcing functions for preventing the acetate syndrome, and deacidifying and reinforcing the cellulose acetate films with the acetate syndrome.

Accordingly, in order to accomplish the above object, the present invention provides a deacidifying and reinforcing agent which is formed by ultrasonically dispersing a magnesium oxide with particle sizes of 20-50 nm into an ethyl cellulose n-butanol solution whose mass fraction is 5%-8%, so as to form a nanometer magnesium oxide suspension, then adding a mixture of E51 EPOXY RESIN and a curing agent thereof with a mass ratio of 1:1 into the nanometer magnesium oxide suspension and thoroughly mixing; wherein a mass ratio of the ethyl cellulose n-butanol solution, the magnesium oxide, and the mixture of the E51 EPOXY RESIN and the curing agent thereof is 100:(0.8-1.5):(2-5).

Preferably, according to the present invention, the deacidifying and reinforcing agent is formed by ultrasonically dispersing the magnesium oxide with the particle sizes of 20-50 nm into the ethyl cellulose n-butanol solution whose mass fraction is 7%, so as to form the nanometer magnesium oxide suspension, then adding the mixture of the E51 EPOXY RESIN and the curing agent thereof with the mass ratio of 1:1 into the nanometer magnesium oxide suspension and thoroughly mixing; wherein the mass ratio of the ethyl cellulose n-butanol solution, the magnesium oxide, and the mixture of the E51 EPOXY RESIN and the curing agent thereof is 100:1:3.

According to the present invention, a method for using a deacidifying and reinforcing agent for a cellulose acetate film comprises steps of: grapping absorbent cotton with forceps to absorb the deacidifying and reinforcing agent for the cellulose acetate film, evenly applying the deacidifying and reinforcing agent on a surface of a cellulose acetate film, and naturally drying the cellulose acetate film.

Compared with the prior art, the present invention has the following beneficial effects:

1. The present invention uses nanometer magnesium oxide as a deacidification material with functions such as odorless, non-toxic, small particle size, and large specific surface area. The deacidification forms a compound with ethyl cellulose which is a polymer film-forming material with excellent film-forming ability, low adhesion and high durability. The E51 EPOXY RESIN and the curing agent thereof are used as additives with strong adhesion, low viscosity, high toughness, low contraction force, excellent mechanical properties, chemical resistance and heat resistance. By ultrasonic vibration, the above three materials are mixed with good compatibility, and suspension is formed with a small amount of nanometer magnesium oxide and high acid removal efficiency. Furthermore, the nanometer magnesium oxide amount can be freely adjusted according to an acidification degree of the film, which is easy to operate. To a certain extent, the present invention can fill film scratches on the substrate, so as to repair the scratches; wherein the ethyl cellulose is not only used as a film forming agent, but also used as a good dispersion and stabilizer of the nanometer magnesium oxide, which can uniformly and stably disperse the nanometer magnesium oxide in the ethyl cellulose solution. The obtained nanometer magnesium oxide suspension has good stability, which is difficult to coagulate and has sufficient reinforcing effect on the degraded cellulose acetate film after film forming. Based on good mutual solubility with the deacidifying and reinforcing agent, the E51 EPOXY RESIN and the curing agent thereof with excellent film-forming ability and adhesiveness increase the adhesion and heat resistance of the film and the substrate after curing. Therefore, the deacidifying and reinforcing agent has integrated deacidifying and reinforcing functions, leading to wide application value.

2. After applying the deacidifying and reinforcing agent of the present invention, deacidifying agent can evenly cover the surface of the film, which can effectively inhibit the autocatalytic action of free acid on the film substrate, inhibit further aging of the film, have a remarkable deacidification effect, and have strong operability. The operation will not affect the image information recorded on the film, and there is a certain repair function on the film scratches.

3. The deacidifying and reinforcing agent of the present invention can fundamentally inhibit the autocatalytic effect of acetate gas emitted by degradation of cellulose acetate film with acetate syndrome. To a certain extent, the present invention improves the mechanical properties of the film, and reinforces the cellulose acetate film which has been severely aged and degraded, in such a manner that the film can be used, copied and digitized. The present invention has very important significance and application value.

DETAILED DESCRIPTION OF THE PREFERRED EMBODIMENT

Figure 1:
FIG. 1 is a partial scanning photograph of an unprocessed film under a super depth of field.
Figure 2:
FIG. 2 is a partial scanning photograph of a film treated with a deacidifying and reinforcing agent according to an embodiment 1 under a super depth of field.
Figure 3:
FIG. 3 is a scanning photograph of partial scratches of the unprocessed film under a super depth of field.
Figure 4:
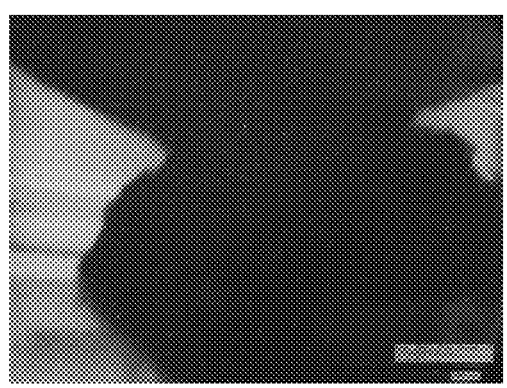
FIG. 4 is a scanning photograph of partial scratches of the film treated with the deacidifying and reinforcing agent according to the embodiment 1 under a super depth of field.
Figure 5:
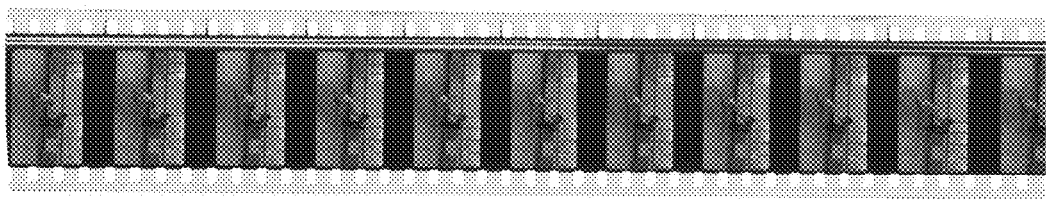
FIG. 5 is an overall scanning photograph of the unprocessed film.
Figure 6:
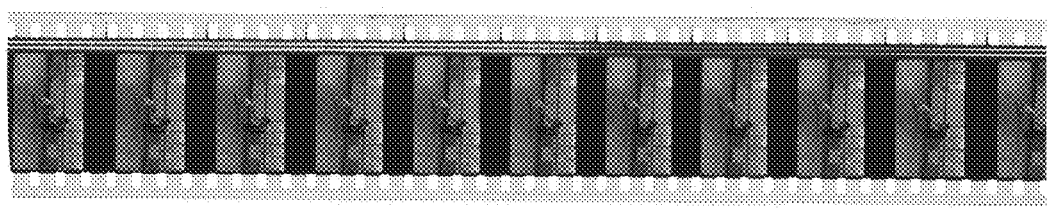
FIG. 6 is an overall scanning photograph of the film treated with the deacidifying and reinforcing agent according to the embodiment 1.
Figure 7:
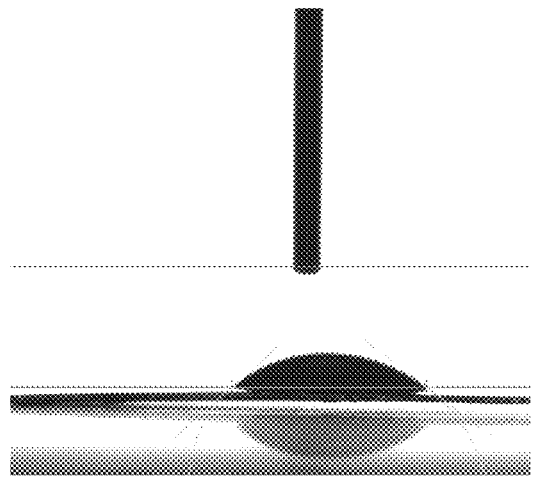
FIG. 7 illustrates an aqueous contact angle of a substrate without using the deacidifying and reinforcing agent.
Figure 8:
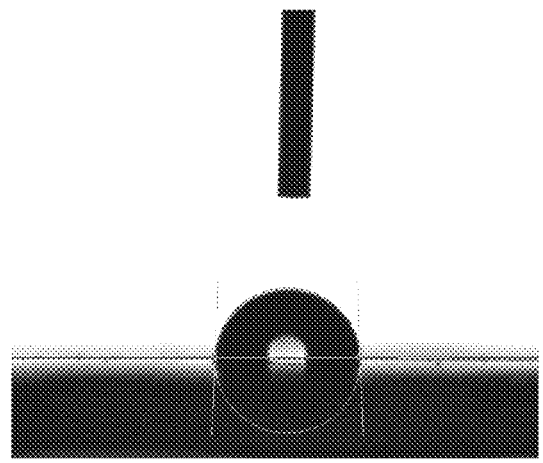
FIG. 8 illustrates an aqueous contact angle of the substrate using the deacidifying and reinforcing agent according to the embodiment 1.
Figure 9:
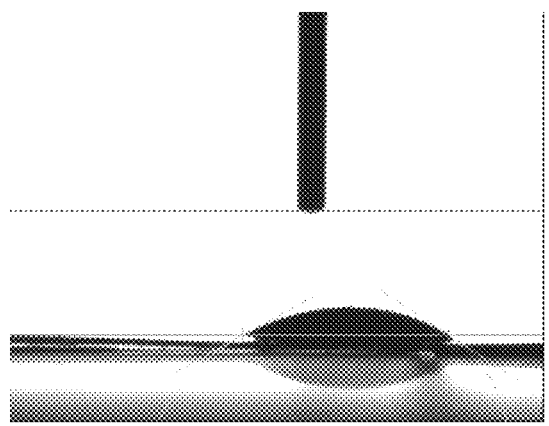
FIG. 9 illustrates an aqueous contact angle of an emulsion layer without using the deacidifying and reinforcing agent.
Figure 10:
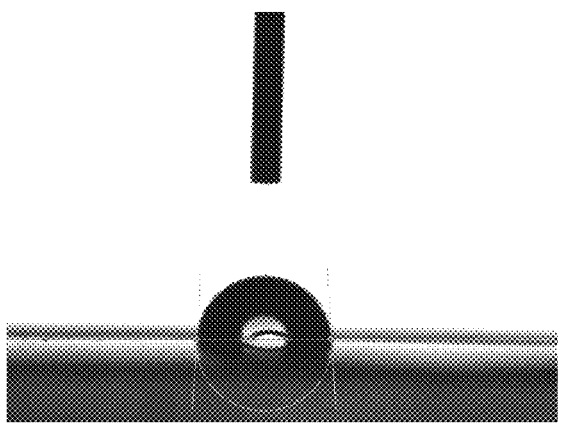
FIG. 10 illustrates an aqueous contact angle of the emulsion layer using the deacidifying and reinforcing agent.

Referring to the drawings and embodiments, the present invention will be further illustrated. However, the scope of the present invention is not limited by the embodiments.

Embodiment 1

Adding 1.0 g magnesium oxide with particle sizes of 30 nm into 100 g ethyl cellulose n-butanol solution whose mass fraction is 7%, and ultrasonically dispersing for 30 min to form a nanometer magnesium oxide suspension, then adding 3.0 g mixture of E51 EPOXY RESIN and a curing agent thereof with a mass ratio of 1:1 into the nanometer magnesium oxide suspension, and stirring for 15 min to obtain a deacidifying and reinforcing agent for a cellulose acetate film.

Embodiment 2

Adding 0.8 g magnesium oxide with particle sizes of 20 nm into 100 g ethyl cellulose n-butanol solution whose mass fraction is 5%, and ultrasonically dispersing for 30 min to form a nanometer magnesium oxide suspension, then adding 2 g mixture of E51 EPOXY RESIN and a curing agent thereof with a mass ratio of 1:1 into the nanometer magnesium oxide suspension, and stirring for 15 min to obtain a deacidifying and reinforcing agent for a cellulose acetate film.

Embodiment 3

Adding 1.5 g magnesium oxide with particle sizes of 50 nm into 100 g ethyl cellulose n-butanol solution whose mass fraction is 8%, and ultrasonically dispersing for 30 min to form a nanometer magnesium oxide suspension, then adding 5 g mixture of E51 EPOXY RESIN and a curing agent thereof with a mass ratio of 1:1 into the nanometer magnesium oxide suspension, and stirring for 15 min to obtain a deacidifying and reinforcing agent for a cellulose acetate film.

In order to determine the composition of the deacidifying and reinforcing agent of the present invention, the inventors conducted a large number of laboratory research tests, and the specific test conditions are as follows:

1. Selection of Deacidifying Materials

Stirring and adding 0.5 g different deacidifying materials ($Mg(OH)_2$, $Ca(OH)_2$, $Ba(OH)_2$, CaO, BaO, MgO (commonly used in laboratory), CuO with particle sizes of 40 nm, MgO with particle sizes of 20 nm, and MgO with particle sizes of 50 nm) into 100 g ethyl cellulose n-butanol solution whose mass fraction is 7%, and ultrasonically dispersing for 30 min; standing and observing stability of obtained suspension; grapping absorbent cotton with forceps to apply the suspension on a surface of a cellulose acetate film which is cleaned and flattened; after drying, screening the deacidifying materials by pH, surface drying time, film forming appearance, adhesion, and hardness tests. Results are shown in Tables 1-3.

TABLE 1 stability of different deacidifying materials

| | Settlement height/mm | | | | | | | | |
|---|---|---|---|---|---|---|---|---|---|
| Standing time/day | $Mg(OH)_2$ | $Ca(OH)_2$ | $Ba(OH)_2$ | CaO | BaO | MgO | nanometer MgO (50 nm) | nanometer MgO (20 nm) | nanometer CuO (40 nm) |
| 3 | 3.2 | 3.0 | 4.0 | 3.2 | 3.8 | 3.1 | — | — | — |
| 7 | 4.1 | 3.8 | 5.0 | 4.0 | 4.9 | 4.0 | slightly | — | slightly |
| 15 | completely | completely | completely | completely | completely | completely | <1 | slightly | <1 |

TABLE 2 film forming performance of different deacidifying materials

| Deacidifying material | Adhesion | Hardness | Surface drying time | appearance | Adhesive or not |
|---|---|---|---|---|---|
| $Mg(OH)_2$ | 1 degree | 2H | ~80 s | slightly scratched, granular | no |
| $Ca(OH)_2$ | 1 degree | H | ~80 s | slightly scratched, granular | no |
| $Ba(OH)_2$ | 2 degrees | H | ~120 s | slightly scratched, granular | no |
| CaO | 1 degree | B | ~80 s | slightly scratched, granular | no |
| BaO | 2 degrees | B | ~120 s | slightly scratched, granular | no |
| MgO | 0 degree | 2H | ~80 s | slightly scratched, granular | no |
| nanometer MgO (50 nm) | 0 degree | 3H | ~80 s | granular | no |
| nanometer MgO (20 nm) | 0 degree | 3H | ~80 s | flat and smooth | no |
| nanometer CuO (40 nm) | 0 degree | 3H | ~80 s | flat and smooth | no |

Referring stability and film forming performance of different deacidifying material suspension as shown in Tables 1 and 2, stabilities of suspension formed by commonly used $Mg(OH)_2$, $Ca(OH)_2$, $Ba(OH)_2$, CaO, BaO and MgO are relatively poor, which have settlement heights of more than 3 mm after 3 days and are completely settled after 15 days. Furthermore, after film forming, adhesion and levelling property are also poor, and film appearances are slightly scratched and granular. Due to small particle sizes and large specific surface area, MgO with the particle sizes of 20 nm can be compatible with a film-forming material. The suspension exhibits good stability, and the film has a flat and smooth appearance with good adhesion and hardness.

TABLE 3 deacidifying ability of different deacidifying materials

| | | Deacidifying agent | | |
|---|---|---|---|---|
| Number | Blank sample | 0.5% CuO (40 nm) | 0.5% MgO (50 nm) | 0.5% MgO (20 nm) |
| 1 | 3.53 | 3.61 | 4.94 | 5.30 |
| 2 | 3.60 | 3.68 | 5.01 | 5.28 |
| 3 | 3.42 | 3.60 | 5.11 | 5.34 |
| average (pH) | 3.52 | 3.63 | 5.02 | 5.31 |

Referring stability and film forming performance of different deacidifying material suspension as shown in Tables 1 and 2, nanometer MgO and nanometer CuO are preliminarily selected as the deacidifying materials, then deacidifying performances are tested, wherein CuO with the particle sizes of 40 nm has a relatively poor deacidifying performance. Therefore, the present invention finally selects MgO with the particle sizes of 20-50 nm as the deacidifying material.

2. Screening of Film Forming Materials
(1) Experiment Instruments and Materials

Selecting appropriate solvent for forming 100 g solution with a mass fraction of 7% respectively with film forming materials such as ethyl cellulose (EC), B72 (a copolymer of methyl acrylate-ethyl methacrylate), F2314 (a random copolymer of vinylidene fluoride and chlorotrifluoroethylene in a copolymerization ratio of 1:4), waterborne polyurethane, waterborne epoxy resin and PEG6000 which are commonly used in archive protection and repair; quickly stirring and adding 1 g MgO with particle sizes of 30 nm; ultrasonically dispersing for 30 min to form a magnesium oxide suspension; grapping absorbent cotton with forceps to apply the suspension on a surface of a cellulose acetate film which is cleaned and flattened; after drying, screening the film forming materials by surface drying time, film forming appearance, adhesion, and hardness tests. Results are shown in Table 4.

TABLE 4 film forming performance of different film forming materials

| Film forming material | Surface drying time | Levelling property | Appearance | Adhesion | Hardness |
|---|---|---|---|---|---|
| EC | ~80 s | good | flat and smooth | 0 degree | 3H |
| B72 | ~60 s | poor | slightly scratched, granular | 2 degrees | HB |
| F2314 | ~60 s | poor | slightly scratched, granular | 2 degrees | HB |
| waterborne polyurethane | ~60 s | poor | slightly scratched, granular | 1 degree | H |
| waterborne epoxy resin | ~80 s | good | granular | 3 degrees | HB |
| PEG6000 | ~80 s | good | whitened | 2 degrees | HB |

Referring to Table 4, film forming time of materials B72, F2314 and waterborne polyurethane after being applied on the film surface is short, but the levelling property is poor, wherein the film is slightly scratched and granular while adhesion and hardness are poor, which cannot meet the actual needs. Although the levelling of waterborne epoxy resin is good, the appearance is granular while adhesion and hardness are relatively poor. PEG6000 has good levelling property, but the film appearance is whitened, which will affect record information of image archives, and adhesion and hardness are poor. Ethyl cellulose shows good levelling property, adhesion, hardness and smooth film appearance. Therefore, the present invention selects ethyl cellulose as the film forming material.

3. Determining Formula of Deacidifying and Reinforcing Agent

Adding 7 g ethyl cellulose into a round bottom flask containing 93 g n-butanol; stirring and refluxing until the ethyl cellulose is fully dissolved; stopping heating and refluxing to obtain an ethyl cellulose n-butanol solution whose mass fraction is 7%; quickly stirring and respectively adding 0.1 g, 0.3 g, 0.5 g, 0.8 g, 1.0 g and 1.5 g MgO with particle sizes of 30 nm; ultrasonically dispersing for 30 min to respectively prepare magnesium oxide suspensions with mass fractions of 0.1%, 0.3%, 0.5%, 0.8% and 1%; adding 3 g mixture of E51 EPOXY RESIN and a curing agent thereof with a mass ratio of 1:1 and fully mixing; grapping absorbent cotton with forceps to apply the suspension on a surface of a cellulose acetate film which is cleaned and flattened; and testing effects of nanometer MgO with different concentrations on pH value of the film. Results are shown in Table 5.

TABLE 5

Effects of nanometer MgO with different concentrations on pH value of film

| Number | Blank sample | Concentration of nanometer MgO | | | | |
| | | 0.1% | 0.3% | 0.5% | 0.8% | 1% |
|---|---|---|---|---|---|---|
| 1 | 4.19 | 4.82 | 5.13 | 5.78 | 6.82 | 7.58 |
| 2 | 4.23 | 4.79 | 5.10 | 5.80 | 6.85 | 7.56 |
| 3 | 4.20 | 4.79 | 5.15 | 5.76 | 6.84 | 7.50 |
| Average (pH) | 4.21 | 4.80 | 5.13 | 5.78 | 6.84 | 7.55 |

The pH value is a key evaluation parameter to screen the concentration of the nanometer magnesium oxide. Referring to Table 5, the pH of the film increases with the increase of magnesium oxide concentration. When the amount of magnesium oxide increases to 1%, the pH of the film rises to about 7 and achieves a good deacidification effect. In practical applications, the magnesium oxide concentration can be adjusted according to the pH of film file to be deacidified, so as to achieve a flexible application effect.

In order to prove the beneficial effects of the present invention, the inventors performed performance evaluation of the deacidifying and reinforcing agent of according to the embodiment 1, and specific tests are as follows:

1. Evaluation of Film Forming Performance

Taking middle portions of three volumes of Chinese cellulose acetate film produced in 1980s (available from the Xi'an Film Library of the China Film Archive, which has been disposed); grapping absorbent cotton with forceps to absorb the deacidifying and reinforcing agent, evenly applying the deacidifying and reinforcing agent on both sides of the cellulose acetate film, and naturally drying; observing appearance changes at the same location on the film before and after applying the deacidifying and reinforcing agent with VHX-600 digital super depth microscope and film scanner respectively. The results are shown in FIGS. 1-6, wherein the surface of the movie film treated with the deacidifying and reinforcing agent of the present invention is uniform, smooth and flat; the image is clear and complete, and the original appearance of the image recorded on the film is restored.

2. Effect of Deacidifying and Reinforcing Agent on Film Translucency

Taking middle portions of three volumes of Chinese cellulose acetate film produced in 1980s (available from the Xi'an Film Library of the China Film Archive, which has been disposed); grapping absorbent cotton with forceps to absorb the deacidifying and reinforcing agent, evenly applying the deacidifying and reinforcing agent on both sides of the cellulose acetate film, and naturally drying; testing optical density changes at the same location on the film before and after applying the deacidifying and reinforcing agent with X-Rite 361T bench-top transmissive densitometer. The results are shown in Table 6.

TABLE 6 optical density test results before and after applying the deacidifying and reinforcing agent

| Number | 1#before | 1#after | 2#before | 2#after | 3#before | 3#after |
|---|---|---|---|---|---|---|
| 1 | 0.46 | 0.46 | 0.16 | 0.16 | 0.32 | 0.32 |
| 2 | 0.46 | 0.46 | 0.16 | 0.16 | 0.32 | 0.32 |
| 3 | 0.46 | 0.46 | 0.16 | 0.16 | 0.32 | 0.32 |

TABLE 6-continued optical density test results before and after applying the deacidifying and reinforcing agent

| Number | 1#before | 1#after | 2#before | 2#after | 3#before | 3#after |
|---|---|---|---|---|---|---|
| 4 | 0.46 | 0.46 | 0.16 | 0.16 | 0.32 | 0.32 |
| 5 | 0.46 | 0.46 | 0.16 | 0.16 | 0.32 | 0.32 |
| average/OD | 0.46 | 0.46 | 0.16 | 0.16 | 0.32 | 0.32 |

Referring to Table 6, the optical density value of the cellulose acetate film is not changed after applying the deacidifying and reinforcing agent of the present invention, indicating that a protective layer formed by the deacidifying and reinforcing agent of the present invention has good light transmittance. The protective layer will not affect the original optical density of the film, which means the image density of the film will not be changed.

3. Effect of Deacidifying and Reinforcing Agent on Film Mechanical Strength

Taking middle portions of three volumes of Chinese cellulose acetate film produced in 1980s (available from the Xi'an Film Library of the China Film Archive, which has been disposed); grapping absorbent cotton with forceps to absorb the deacidifying and reinforcing agent, evenly applying the deacidifying and reinforcing agent on both sides of the cellulose acetate film, and naturally drying; testing folding resistance and tension resistance of the film before and after applying the deacidifying and reinforcing agent. The results are shown in Table 7.

TABLE 7 folding resistance and tension resistance test results before and after applying the deacidifying and reinforcing agent

| | before | | after | |
|---|---|---|---|---|
| Number | Tension resistance (N) | Folding resistance | Tension resistance (N) | Floding resistance |
| 1 | 20.0 | 0.7 | 38.6 | 1.15 |
| 2 | 19.0 | 0.7 | 41.8 | 1.00 |
| 3 | 19.4 | 0.7 | 38.4 | 1.15 |
| 4 | 22.2 | 0.7 | 36.5 | 0.95 |
| 5 | 23.5 | 0.48 | 34.9 | 1.15 |
| 6 | 27.6 | 0.48 | 35.0 | 0.90 |
| 7 | 25.4 | 0.7 | 34.8 | 0.90 |
| 8 | 23.1 | 0.7 | 40.0 | 0.95 |
| 9 | 23.9 | 0.48 | 39.2 | 1.00 |
| 10 | 26.5 | 0.7 | 38.1 | 0.90 |
| average | 23.1 | 0.63 | 37.7 | 0.92 |

Referring to folding resistance and tension resistance test results before and after applying the deacidifying and reinforcing agent as shown in Table 7, the cellulose acetate film that has undergone the acetate syndrome is relatively fragile, whose tension resistance and folding resistance are relatively low. After applying the deacidifying and reinforcing agent of the present invention, the tension resistance and the folding resistance (double fold times) of the film are improved to different degrees, which shows that the deacidifying and reinforcing agent of the present invention can effectively improve the original mechanical strength of the film, and reinforces the fragile film, thus enabling screening and digitization of the cellulose acetate films with acetate syndrome.

4. Effect of Deacidifying and Reinforcing Agent on Film Hydrophilicity

Dividing middle portions of three volumes of Chinese cellulose acetate film produced in 1980s (available from the Xi'an Film Library of the China Film Archive, which has been disposed) into two groups; using one group as a blank sample without using the deacidifying and reinforcing agent; grapping absorbent cotton with forceps to absorb the deacidifying and reinforcing agent, evenly applying the deacidifying and reinforcing agent on both sides of the cellulose acetate film of the other group, and naturally drying; detecting contact angles of an emulsion layer and an substrate of unprocessed film and film two days after using the deacidifying and reinforcing agent of the present invention through video contact angle. The results are shown in FIGS. 7-10 and Table 8.

TABLE 8 contact angle change before and after applying the deacidifying and reinforcing agent

| | Emulsion layer | | Substrate | |
|---|---|---|---|---|
| Number | untreated | treated | untreated | treated |
| 1 | 33.5° | 85.4° | 43.2° | 87.5° |
| 2 | 33.2° | 85.7° | 43.8° | 87.0° |
| 3 | 34.0° | 85.0° | 43.7° | 87.8° |
| 4 | 33.8° | 85.1° | 43.2° | 87.1° |
| 5 | 34.3° | 86.0° | 43.8° | 86.7° |
| average | 33.8° | 85.4° | 43.4° | 87.2° |

Referring to FIGS. 7-10 and Table 8, after applying the deacidifying and reinforcing agent of the present invention, the contact angle between the emulsion layer and the substrate of the film is significantly increased, which means that the hydrophobicity of the film is significantly improved after applying the deacidifying and reinforcing agent of the present invention.

5. Acid Resistance Evaluation

Taking a middle portion of a volume of Chinese cellulose acetate film produced in 1980s, removing plasticizer crystals deposited on the film surface with N-butanol, and using a physical recovery tester for physical recovery; taking testing sample once every 20 m, using one group as a blank sample (untreated sample below); grapping absorbent cotton with forceps to absorb the deacidifying and reinforcing agent, evenly applying the deacidifying and reinforcing agent on both sides of the cellulose acetate film of the other group, and naturally drying (treated sample below).

Respectively placing the untreated and treated samples of the same film in a vacuum desiccator with same specification which contains acetic acid saturated steam; storing for 15 days with a temperature of 20±3° C. and a humidity of 50±5% RH; observing sample appearances and testing performance changes of the treated and untreated samples. The results are shown in FIGS. 11-12 and Tables 9-13.

(1) Film Appearance

Figure 11:
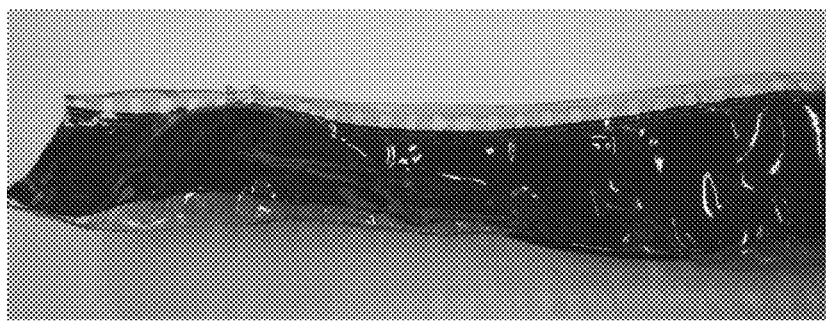
FIG. 11 illustrates overall deformation of the unprocessed film after 15 days in an acidic environment.
Figure 12:
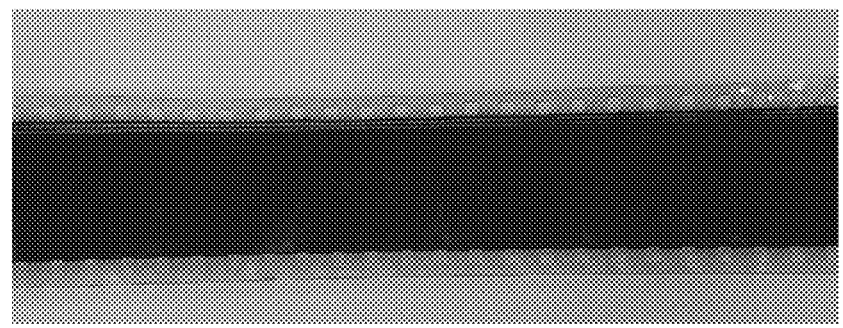
FIG. 12 illustrates overall deformation of the treated film after 15 days in the acidic environment.

Referring to FIGS. 11 and 12, the untreated sample are severely distorted and deformed in the acetic acid environment. The edge of the film was liquefied and curled. Meanwhile, the treated sample is only slightly deformed, indicating that the deacidifying and reinforcing agent of the present invention has a certain resistance to distortion.

(2) Change in Contact Angle

TABLE 9 contact angle change of film emulsion layer before and after acid aging

| | 0 day | | 15 days | |
|---|---|---|---|---|
| Number | Untreated sample | Treated sample | Untreated sample | Treated sample |
| 1 | 33.5° | 85.4° | 28.4° | 85.0° |
| 2 | 33.2° | 85.7° | 28.0° | 85.4° |
| 3 | 34.0° | 85.0° | 28.1° | 85.2° |
| 4 | 33.8° | 85.1° | 27.9° | 85.0° |
| 5 | 34.3° | 86.0° | 27.6° | 85.9° |
| average | 33.8° | 85.4° | 28.0° | 85.3° |

TABLE 10 contact angle change of film substrate before and after acid aging

| | 0 day | | 15 days | |
|---|---|---|---|---|
| Number | Untreated sample | Treated sample | Untreated sample | Treated sample |
| 1 | 43.2° | 87.5° | 38.2° | 87.2° |
| 2 | 43.8° | 87.0° | 38.5° | 87.4° |
| 3 | 43.7° | 87.8° | 37.9° | 87.0° |
| 4 | 43.2° | 87.1° | 37.5° | 86.9° |
| 5 | 43.8° | 86.7° | 38.0° | 87.0° |
| average | 43.4° | 87.2° | 38.0° | 87.1° |

Referring to data in Tables 9 and 10, applying the deacidifying and reinforcing agent of the present invention can increase the surface contact angle of the film, indicating that the hydrophobicity of the film is improved. After 15 days in a saturated acetic acid concentration environment, the surface contact angle of the untreated sample is reduced while the treated sample is substantially unchanged. It is because the protective layer formed on the film surface by the deacidifying and reinforcing agent of the present invention has excellent weathering resistance and film forming ability, so as to relieve the degradation of the film emulsion layer to a certain extent, which is consistent with the above-mentioned results of surface appearance change experiment of the film and indicates that the protective layer is able to protect the film.

(3) Change in Acidity

TABLE 11 test results of film acidity change before and after acid aging

| | 0 day | | 15 days | |
|---|---|---|---|---|
| Number | Untreated sample | Treated sample | Untreated sample | Treated sample |
| 1 | 4.19 | 7.58 | 3.26 | 7.18 |
| 2 | 4.23 | 7.56 | 3.18 | 7.32 |
| 3 | 4.20 | 7.50 | 3.32 | 7.20 |
| average | 4.21 | 7.55 | 3.25 | 7.23 |

Referring to Table 11, the acidity of the film after applying the deacidifying and reinforcing agent of the present invention is greatly increased, and the acidity of the untreated sample is decreased after being left in a saturated acetic acid concentration environment for 15 days, while the acidity of the treated sample is slightly changed, indicating that with increase of the film acidity, the autocatalytic action of the acidified film is reduced, and the cleavage of the acetyl side group of the triacetyl cellulose ester from the polymer chain is slowed down, which means the degree of acetic acid formation is reduced. Furthermore, the untreated film is more likely to absorb moisture in the surrounding environment and be degraded, or the gelatin in the film emulsion layer is more prone to degradation and deterioration, which means that the protective layer formed on the surface of the film by the deacidifying and reinforcing agent of the present invention can protect the film and delay the occurrence of film acidification and degradation.

TABLE 12 test results of film tension resistance before and after acid aging

| | 0 day | | 15 days | |
|---|---|---|---|---|
| Number | Untreated sample | Treated sample | Untreated sample | Treated sample |
| 1 | 20.0 | 38.6 | 5.6 | 32.1 |
| 2 | 19.0 | 41.8 | 7.8 | 30.8 |
| 3 | 19.4 | 38.4 | 8.4 | 34.9 |
| 4 | 22.2 | 36.5 | 6.2 | 38.0 |
| 5 | 23.5 | 34.9 | 6.9 | 38.7 |
| 6 | 27.6 | 35.0 | 5.0 | 35.4 |
| 7 | 25.4 | 34.8 | 7.8 | 30.0 |
| 8 | 23.1 | 40.0 | 9.0 | 33.1 |
| 9 | 23.9 | 39.2 | 8.2 | 39.0 |
| 10 | 26.5 | 38.1 | 8.1 | 37.8 |
| average tension resistance (N) | 23.1 | 37.7 | 7.3 | 31.6 |
| retention rate (%) | 100 | 100 | 31.6 | 83.8 |

TABLE 13 test results of film folding resistance before and after acid aging

| | 0 day | | 15 days | |
|---|---|---|---|---|
| Number | Untreated sample | Treated sample | Untreated sample | Treated sample |
| 1 | 0.7 | 1.15 | — | 0.95 |
| 2 | 0.7 | 1.00 | — | 0.90 |
| 3 | 0.7 | 1.15 | — | 0.85 |
| 4 | 0.7 | 0.95 | 0.3 | 0.78 |
| 5 | 0.48 | 1.15 | 0.3 | 0.78 |
| 6 | 0.48 | 0.90 | — | 0.78 |
| 7 | 0.7 | 0.90 | — | 0.95 |
| 8 | 0.7 | 0.95 | — | 0.90 |
| 9 | 0.48 | 1.00 | 0.3 | 0.85 |
| 10 | 0.7 | 0.90 | 0.3 | 0.85 |
| average | 0.63 | 0.92 | 0.12 | 0.86 |
| retention rate (%) | 100 | 100 | 19.0 | 93.5 |

Referring to Tables 12 and 13, after being treated with the deacidifying and reinforcing agent of present invention, the tension resistance of the film with the acetate syndrome is increased from 23.1 N/mm to 37.7 N/mm, which means that the deacidifying and reinforcing agent of the present invention has a certain reinforcing effect on the fragile film. After 15 days in the saturated acetic acid concentration atmosphere, the tension resistance and folding resistance of the film without the deacidifying and reinforcing agent are decreased greatly, while the tension resistance and folding resistance of the film treated with the deacidifying and reinforcing agent are decreased slightly. It is because the breakage of 1,4 glycosidic bonds during the degradation of the cellulose acetate ester substrate, which is known as triacetyl cellulose ester bond breakage. The acidity of the film without the deacidifying and reinforcing agent low, wherein under the catalysis of acid, water molecules destroy a macromolecule structure and react with the acetyl group of the film substrate. Hydrogen bonds between the macromolecules are recombined, leading to decrease of the tension resistance and the folding resistance after being subjected to external forces.

6. Enduring and Maintaining Effects of the Deacidifying and Reinforcing Agent on the Film In the long-term preservation of movie film, temperature and humidity of the preservation environment are the main factors affecting film life. Water vapor has a certain penetration capacity for polymer materials. Especially, under the effect of heat, this penetration ability is enhanced, and can penetrate inside of material system and accumulate. Therefore, the humidity of the preservation environment directly affects the water content in the film. Under certain conditions, the cellulose triacetate ester, which is the substrate material of the film, is hydrolyzed, which poses a threat to the mechanical strength of the film, the recorded image and the geometric dimensions. Furthermore, the water absorption of gelatin causes that the silver salt photosensitive layer absorbs water vapor and swells, resulting in a change in the relative distance between the silver particles dispersed in the photosensitive layer and blurring the image on the silver salt. The hygrothermal aging test is an important test method for identifying or studying the aging resistance of a material in a high-temperature and high-humidity environment. Therefore, in this experiment, hygrothermal aging is used to evaluate the durable maintenance effect of a deacidifying reinforcing agent on a move film.

Taking a middle portion of a volume of Chinese cellulose acetate film produced in 1980s with acetate syndrome, removing plasticizer crystals deposited on the film surface with N-butanol, and using a physical recovery tester for physical recovery; taking testing sample once every 20 m, using one group as a blank sample (untreated sample below); grapping absorbent cotton with forceps to absorb the deacidifying and reinforcing agent, evenly applying the deacidifying and reinforcing agent on both sides of the cellulose acetate film of the other group, and naturally drying (treated sample below); respectively placing the untreated and treated samples of the same film in an SDJ6025 hygrothermal testing tank; observing sample appearances after aging for 15 and 30 days with a temperature of 50° C. and a humidity of 60% RH, and testing performance changes of the film samples. The results are shown in FIGS. 13-14 and Tables 14-18.

(1) Film Appearance

Figure 13:
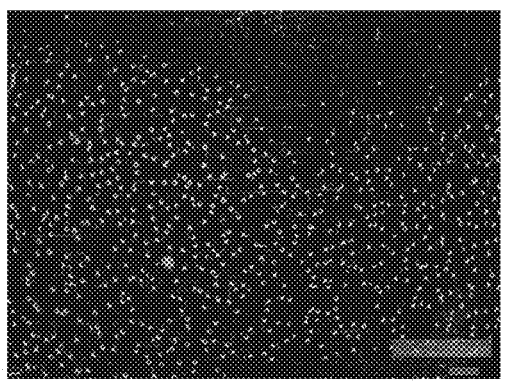
FIG. 13 illustrates surface deformation of the emulsion layer of the unprocessed film after 30 days in a hot and humid environment.
Figure 14:
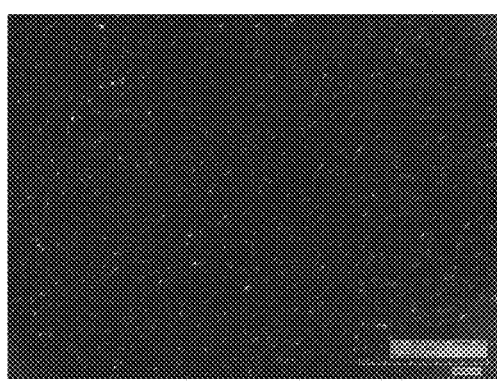
FIG. 14 illustrates surface deformation of the emulsion layer of the treated film after 30 days in the hot and humid environment.

Referring to FIGS. 13 and 14, the film emulsion layer without the deacidifying and reinforcing agent has liquefaction phenomenon, pits of varying degrees appear, and information carried by the film image layer (emulsion layer) is damaged, which may be because the emulsion layer of the acetate syndrome film is degraded and hydrophilicity is increased. Therefore, in a high-humidity and high-temperature environment, the emulsion layer absorbs moisture more easily, deepening the degradation of gelatin in the film emulsion layer. However, the hydrophobicity of the film emulsion layer applied with the deacidifying and reinforcing agent of the present invention is enhanced, and erosion of the gelatin layer by water molecules is hindered, so as to effectively protect the image layer.

(2) Change in Contact Angle

TABLE 14 contact angle change of film emulsion layer before and after hygrothermal aging

| | 0 day | | 15 days | | 30 days | |
|---|---|---|---|---|---|---|
| Number | Untreated sample | Treated sample | Untreated sample | Treated sample | Untreated sample | Treated sample |
| 1 | 33.5° | 85.4° | 32.4° | 85.0° | 28.4° | 84.9° |
| 2 | 33.2° | 85.7° | 30.0° | 85.5° | 27.9° | 84.5° |
| 3 | 34.0° | 85.0° | 31.2° | 84.9° | 28.0° | 84.9° |
| 4 | 33.8° | 85.1° | 30.0° | 85.3° | 28.3° | 84.3° |
| 5 | 34.3° | 86.0° | 31.9° | 86.0° | 28.4° | 85.0° |
| average | 33.8° | 85.4° | 31.1° | 85.3° | 28.2° | 84.7° |

TABLE 15 contact angle change of film substrate before and after hygrothermal aging

| | 0 day | | 15 days | | 30 days | |
|---|---|---|---|---|---|---|
| Number | Untreated sample | Treated sample | Untreated sample | Treated sample | Untreated sample | Treated sample |
| 1 | 43.2° | 87.5° | 40.1° | 86.9° | 37.4° | 86.9° |
| 2 | 43.8° | 87.0° | 40.9° | 87.1° | 38.0° | 86.3° |
| 3 | 43.7° | 87.8° | 40.5° | 87.0° | 37.9° | 86.9° |
| 4 | 43.2° | 87.1° | 40.8° | 87.3° | 37.3° | 86.5° |
| 5 | 43.8° | 86.7° | 40.7° | 87.1° | 37.6° | 86.7° |
| average | 43.4° | 87.2° | 40.6° | 87.1° | 37.6° | 86.7° |

Referring to data in Tables 14 and 15, applying the deacidifying and reinforcing agent of the present invention can increase the surface contact angle of the film, indicating that the hydrophobicity of the film is improved. And with the increase of time in the environment of high temperature and high humidity, the surface contact angle of the untreated sample is reduced while the treated sample is substantially unchanged. It is because the protective layer formed on the film surface by the deacidifying and reinforcing agent of the present invention has excellent weathering resistance and film forming ability, so as to relieve the degradation of the film emulsion layer to a certain extent, which is consistent with the above-mentioned results of surface appearance change experiment of the film and indicates that the protective layer is able to protect the film.

(3) Change in Acidity

TABLE 16 test results of film acidity change before and after hygrothermal aging

| | 0 day | | 15 days | | 30 days | |
|---|---|---|---|---|---|---|
| Number | Untreated sample | Treated sample | Untreated sample | Treated sample | Untreated sample | Treated sample |
| 1 | 4.19 | 7.58 | 3.83 | 7.41 | 3.16 | 7.01 |
| 2 | 4.23 | 7.56 | 3.80 | 7.39 | 3.23 | 6.99 |
| 3 | 4.20 | 7.50 | 3.88 | 7.45 | 3.10 | 6.95 |
| average | 4.21 | 7.55 | 3.84 | 7.42 | 3.16 | 6.98 |

Referring to Table 14, the acidity of the film after applying the deacidifying and reinforcing agent of the present invention is greatly increased, and the acidity of the untreated sample is decreased with the increase of time in the hygrothermal environment, while the acidity of the treated sample is slightly changed, because the untreated film is more likely to absorb moisture in the surrounding environment and be degraded, or the gelatin in the film emulsion layer is more prone to degradation and deterioration, which means that the protective layer formed on the surface of the film by the deacidifying and reinforcing agent of the present invention can protect the film and delay the occurrence of film acidification and degradation.

(4) Changes in Film Mechanical Strength

TABLE 17 test results of film tension resistance before and after hygrothermal aging

| number | 0 day | | 15 days | | 30 days | |
|---|---|---|---|---|---|---|
| | Untreated sample | Treated sample | Untreated sample | Treated sample | Untreated sample | Treated sample |
| 1 | 20.0 | 38.6 | 13.5 | 35.8 | 6.9 | 30.5 |
| 2 | 19.0 | 41.8 | 12.0 | 35.3 | 6.8 | 31.3 |
| 3 | 19.4 | 38.4 | 11.7 | 34.5 | 7.0 | 28.8 |
| 4 | 22.2 | 36.5 | 12.2 | 36.6 | 6.2 | 30.9 |
| 5 | 23.5 | 34.9 | 14.3 | 32.4 | 4.6 | 32.4 |
| 6 | 27.6 | 35.0 | 14.7 | 33.1 | 5.0 | 27.9 |
| 7 | 25.4 | 34.8 | 13.0 | 37.8 | 6.0 | 27.8 |
| 8 | 23.1 | 40.0 | 13.1 | 32.9 | 5.8 | 28.6 |
| 9 | 23.9 | 39.2 | 12.9 | 34.5 | 4.1 | 30.5 |
| 10 | 26.5 | 38.1 | 11.8 | 37.9 | 5.2 | 33.1 |
| average tension resistance (N) | 23.1 | 37.7 | 12.9 | 35.1 | 5.8 | 30.2 |
| retention rate (%) | 100 | 100 | 55.8 | 93.1 | 25.1 | 80.1 |

TABLE 18 test results of film folding resistance before and after hygrothermal aging

| Number | 0 day | | 15 days | | 30 days | |
|---|---|---|---|---|---|---|
| | Untreated sample | Treated sample | Untreated sample | Treated sample | Untreated sample | Treated sample |
| 1 | 0.70 | 1.15 | 0.30 | 1.00 | 0.30 | 0.78 |
| 2 | 0.70 | 1.00 | 0.48 | 1.00 | — | 0.85 |
| 3 | 0.70 | 1.15 | 0.30 | 1.15 | — | 0.85 |
| 4 | 0.70 | 0.95 | — | 1.00 | 0.30 | 0.78 |
| 5 | 0.48 | 1.15 | 0.30 | 0.90 | 0.30 | 0.78 |
| 6 | 0.48 | 0.90 | 0.48 | 1.00 | — | 0.95 |
| 7 | 0.70 | 0.90 | — | 0.95 | — | 0.78 |
| 8 | 0.70 | 0.95 | — | 0.95 | — | 0.90 |
| 9 | 0.48 | 1.00 | 0.30 | 1.00 | — | 0.85 |
| 10 | 0.70 | 0.90 | 0.30 | 0.90 | — | 0.95 |
| average | 0.63 | 0.92 | 0.25 | 0.89 | 0.09 | 0.85 |
| retention rate (%) | 100 | 100 | 39.7 | 96.7 | 14.3 | 92.4 |

Referring to Tables 17 and 18, for the acetate syndrome film, due to high hydrophilicity and low acidity, water molecules are more likely to be deacetylated and destroy the structure of macromolecules under the autocatalytic action of acid with the increase of time spent in a high-temperature and high-humidity environment, showing a significant decrease in the tension resistance and folding resistance. After the treatment of the deacidifying and reinforcing agent of the present invention, the tension resistance of the film with the acetate syndrome is increased from 23.1 N/mm to 37.7 N/mm, which means that the deacidifying and reinforcing agent of the present invention has a certain reinforcing effect on the fragile film. Furthermore, because the protective layer formed on the surface of the film by the deacidifying and reinforcing agent of the present invention is alkaline and hydrophobic, the synergistic effect of the two prevents the autocatalytic degradation of the acid film to some extent, so as to increase the durability of the film.

What is claimed is:

1. A deacidifying and reinforcing agent for a cellulose acetate ester film, comprising:
    an ethyl cellulose alcohol solution;
    a nanometer alkaline oxide; and
    a mixture of epoxy resin and a curing agent thereof, which are mixed according to a mass fraction of 100:(0.8-1.5):(2-5);
    wherein in the mixture of the epoxy resin and the curing agent thereof, a mass fraction is 1:1.

2. The deacidifying and reinforcing agent, as recited in claim 1, wherein the ethyl cellulose alcohol solution is an ethyl cellulose n-butanol solution whose mass fraction is 5%-8%.

3. The deacidifying and reinforcing agent, as recited in claim 1, wherein particle sizes of the nanometer alkaline oxide is 20-50 nm.

4. The deacidifying and reinforcing agent, as recited in claim 3, wherein the nanometer alkaline oxide is a nanometer magnesium oxide, a nanometer cerium oxide, a nanometer magnesium hydroxide, a nanometer potassium carbonate, a nanometer calcium hydroxide or a nanometer barium hydroxide.

5. A method for preparing a deacidifying and reinforcing agent for a cellulose acetate ester film, comprising steps of:
    1) selecting an ethyl cellulose alcohol solution, a nanometer alkaline oxide, and a mixture of epoxy resin and a curing agent thereof, according to a mass fraction of 100:(0.8-1.5):(2-5);
    wherein in the mixture of the epoxy resin and the curing agent thereof, a mass fraction is 1:1; and
    2) ultrasonically dispersing the nanometer alkaline oxide into the ethyl cellulose alcohol solution, so as to form a nanometer alkaline oxide suspension, then adding the mixture of the epoxy resin and the curing agent thereof into the nanometer alkaline oxide suspension and thoroughly mixing, so as to obtained the deacidifying and reinforcing agent for the cellulose acetate ester film.

6. The method, as recited in claim 5, wherein the ethyl cellulose alcohol solution is an ethyl cellulose n-butanol solution whose mass fraction is 5%-8%.

7. The method, as recited in claim 5, wherein particle sizes of the nanometer alkaline oxide is 20-50 nm.

8. The method, as recited in claim 7, wherein the nanometer alkaline oxide is a nanometer magnesium oxide, a nanometer cerium oxide, a nanometer magnesium hydroxide, a nanometer potassium carbonate, a nanometer calcium hydroxide or a nanometer barium hydroxide.

* * * * *